(12) United States Patent
Sasaki et al.

(10) Patent No.: US 10,116,640 B2
(45) Date of Patent: Oct. 30, 2018

(54) IMAGE PROCESSING SYSTEM, IMAGE PROCESSING DEVICE, AND AUTHENTICATION METHOD

(71) Applicants: Makoto Sasaki, Kanagawa (JP); Junki Aoki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Tomohiro Kuroyanagi, Kanagawa (JP); Fumiyoshi Kittaka, Kanagawa (JP); Koichiro Maemura, Kanagawa (JP)

(72) Inventors: Makoto Sasaki, Kanagawa (JP); Junki Aoki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Tomohiro Kuroyanagi, Kanagawa (JP); Fumiyoshi Kittaka, Kanagawa (JP); Koichiro Maemura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 268 days.

(21) Appl. No.: 15/070,020

(22) Filed: Mar. 15, 2016

(65) Prior Publication Data
US 2016/0277379 A1    Sep. 22, 2016

(30) Foreign Application Priority Data
Mar. 18, 2015  (JP) ................................. 2015-054739

(51) Int. Cl.
G06F 21/00    (2013.01)
H04L 29/06    (2006.01)

(52) U.S. Cl.
CPC .............. *H04L 63/08* (2013.01); *G06F 21/00* (2013.01); *H04L 63/0815* (2013.01)

(58) Field of Classification Search
CPC ...... H04L 63/08; H04L 63/0815; G06F 21/00
See application file for complete search history.

(56) References Cited

U.S. PATENT DOCUMENTS 8,701,158 B2    4/2014  Ohta et al.
8,804,166 B2 *  8/2014  Morita ............... H04N 1/00233
                                                358/1.15

(Continued)

FOREIGN PATENT DOCUMENTS

JP    2012-155568    8/2012

*Primary Examiner* — Farid Homayounmehr
*Assistant Examiner* — Zhimei Zhu
(74) *Attorney, Agent, or Firm* — Harness, Dickey & Pierce, P.L.C.

(57) ABSTRACT

An image processing system includes: a first image processing device including: an input unit that receives an input of first authentication information for authenticating a user based on a first authentication method; an authentication unit that performs authentication on an own device by using the first authentication information; and a cooperating unit that uses a function of one or more second image processing devices. The authentication unit transmits, when the cooperating unit is to be operated, the first authentication information to the one or more second image processing devices, and transmits, when authentication to a second image processing device based on the first authentication information has failed, a transmission request of authentication method information indicating a second authentication method of the second image processing device to the second image processing device, the authentication to which based on the first authentication information has failed.

4 Claims, 16 Drawing Sheets

(56) References Cited

U.S. PATENT DOCUMENTS

| | | | |
|---|---|---|---|
| 2013/0081118 A1* | 3/2013 | Ge | H04L 63/0815 |
| | | | 726/6 |
| 2014/0362407 A1 | 12/2014 | Sasaki et al. | |
| 2015/0109638 A1 | 4/2015 | Sasaki | |
| 2015/0271353 A1 | 9/2015 | Nishimura et al. | |
| 2015/0293728 A1 | 10/2015 | Nishimura et al. | |
| 2015/0341441 A1 | 11/2015 | Saitoh et al. | |
| 2015/0350178 A1* | 12/2015 | Yang | H04L 63/0853 |
| | | | 713/168 |
| 2016/0073259 A1* | 3/2016 | Lee | G06F 3/04842 |
| | | | 715/734 |

\* cited by examiner

IMAGE PROCESSING SYSTEM, IMAGE PROCESSING DEVICE, AND AUTHENTICATION METHOD

CROSS-REFERENCE TO RELATED APPLICATIONS

The present application claims priority to and incorporates by reference the entire contents of Japanese Patent Application No. 2015-054739 filed in Japan on Mar. 18, 2015.

BACKGROUND OF THE INVENTION

1. Field of the Invention

The present invention relates to an image processing system, an image processing device, and an authentication method.

2. Description of the Related Art

A technology of an image processing system capable of executing a function that cannot be implemented by a single image processing device by cooperating with other image processing device that can implement the function has been conventionally known. Moreover, a technology of causing when a plurality of image processing devices are to be operated in cooperation with each other, a specific image processing device to have an authentication function of an entire image processing system has been conventionally known.

Japanese Patent Application Laid-open No. 2012-155568 discloses an invention in which a source multifunction peripheral (MFP) of job data transmits an authentication method and authentication server information along with the job data to a destination MFP and in which if the authentication method and the authentication server information of the source MFP are the same as an authentication method and authentication server information of the destination MFP, the authentication of the destination MFP is determined as "authentication completed".

However, in the conventional technology, it takes time to perform user authentication when a plurality of image processing devices are operated in cooperation with each other.

In view of the above, there is a need to reduce the time required for user authentication when a plurality of image processing devices are operated in cooperation with each other.

SUMMARY OF THE INVENTION

It is an object of the present invention to at least partially solve the problems in the conventional technology.

An image processing system includes: a first image processing device; and one or more second image processing devices. The first image processing device includes: an input unit that receives an input of first authentication information for authenticating a user based on a first authentication method; an authentication unit that performs authentication on an own device by using the first authentication information; and a cooperating unit that uses a function of the one or more second image processing devices. The authentication unit transmits, when the cooperating unit is to be operated, the first authentication information to the one or more second image processing devices, and transmits, when authentication to a second image processing device based on the first authentication information has failed, a transmission request of authentication method information indicating a second authentication method of the second image processing device to the second image processing device, the authentication to which based on the first authentication information has failed.

An image processing device includes: a processor; and a memory. By the processor executing commands read out from the memory, the image processing device executes: receiving an input of first authentication information for authenticating a user based on a first authentication method at an input unit; performing authentication on an own device by using the first authentication information at an authentication unit; using a function of the one or more second image processing devices at a cooperating unit; transmitting, when the cooperating unit is to be operated, the first authentication information to the one or more second image processing devices at the authentication unit; and transmitting, when authentication to a second image processing device based on the first authentication information has failed, a transmission request of authentication method information indicating a second authentication method of the second image processing device to the second image processing device, the authentication to which based on the first authentication information has failed, at the authentication unit.

An authentication method is for a first image processing device connected to one or more second image processing devices. The authentication method includes: receiving an input of first authentication information for authenticating a user based on a first authentication method at an input unit; performing authentication on an own device by using the first authentication information at an authentication unit; using a function of the one or more second image processing devices at a cooperating unit; transmitting, when the cooperating unit is to be operated, the first authentication information to the one or more second image processing devices at the authentication unit; and transmitting, when authentication to a second image processing device based on the first authentication information has failed, a transmission request of authentication method information indicating a second authentication method of the second image processing device to the second image processing device, the authentication to which based on the first authentication information has failed, at the authentication unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing system, image processing device, and an authentication method will be explained in detail below with reference to the accompanying drawings.

Figure 1:
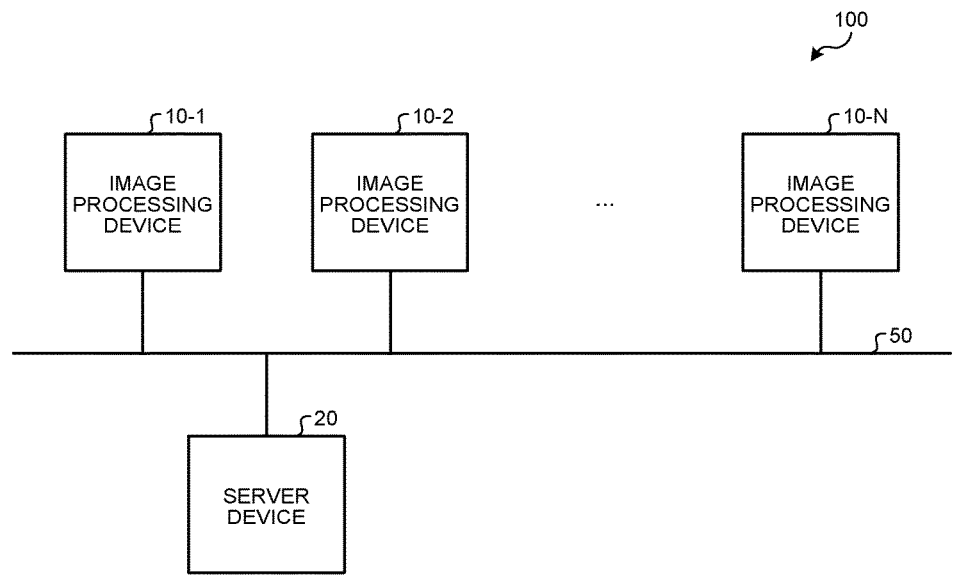
FIG. 1 is a diagram of a device configuration example of an image processing system according to a first embodiment.

FIG. 1 is a diagram of a device configuration example of an image processing system 100 according to a first embodiment. The image processing system 100 according to the first embodiment includes image processing devices 10-1 to 10-N (N: an integer of 2 or more) and a server device 20. The image processing devices 10-1 to 10-N and the server device 20 are connected to each other via a network 50. A connection system of the network 50 may be a wired system or a wireless system, or may be a combination of the wired system and the wireless system. Hereinafter, the image processing devices 10-1 to 10-N are simply called "image processing device(s) 10" when they are not distinguished from each other.

The image processing device 10 has functions such as Copy, FAX, Scan, Print, and an optical character reader (OCR). The performances and the like related to image processing of the image processing devices 10 may be different from each other. The performance of the image processing includes, for example, the presence or absence of available functions, available sizes of print paper, information as to whether or not color printing is supported, information as to whether or not duplex printing is supported, and print speed (PPM: Page Per Minute).

The server device 20 performs control for operating the image processing devices 10-1 to 10-N in cooperation with each other. The server device 20 receives an authentication request, from, for example, an image processing device 10, to use a cooperation function of using functions of the other image processing devices 10.

Figure 2:
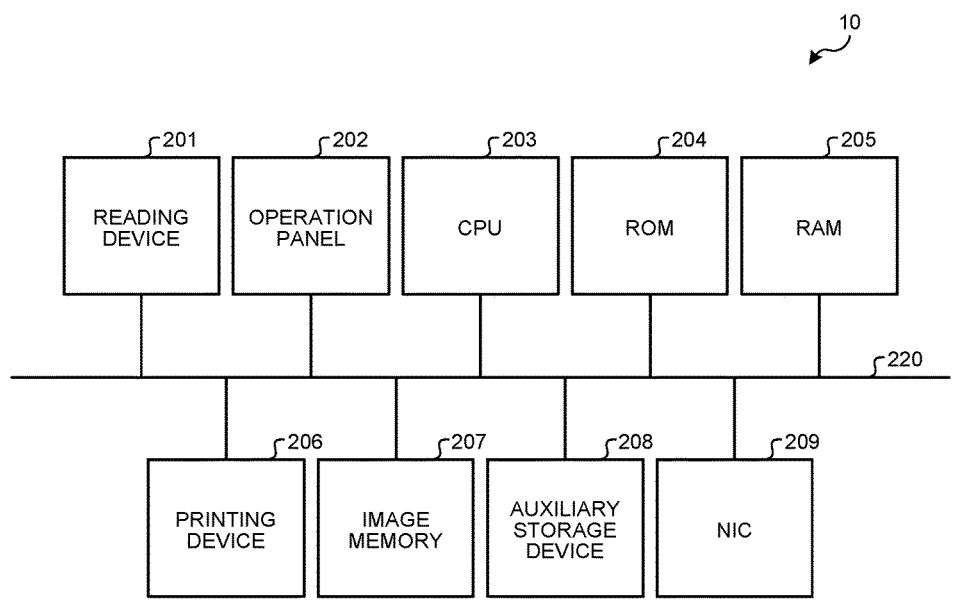
FIG. 2 is a diagram of a hardware configuration example of an image processing device according to the first embodiment.

FIG. 2 is a diagram of a hardware configuration example of the image processing device 10 according to the first embodiment. The image processing device 10 according to the first embodiment includes a reading device 201, an operation panel 202, a central processing unit (CPU) 203, a read-only memory (ROM) 204, a random access memory (RAM) 205, a printing device 206, an image memory 207, an auxiliary storage device 208, and a network interface card (NIC) 209. The reading device 201, the operation panel 202, the CPU 203, the ROM 204, the RAM 205, the printing device 206, the image memory 207, the auxiliary storage device 208, and the NIC 209 are connected to each other via a bus 220.

The reading device 201 is a scanner that reads a document. The operation panel 202 is a device capable of display and input of information. The operation panel 202 is, for example, a liquid crystal touch panel. The CPU 203 executes programs and thereby controls operations of the image processing device 10. The ROM 204 stores programs and the like executed by the CPU 203. The RAM 205 temporarily stores information on a program when the CPU 203 executes the program.

The printing device 206 is a plotter that prints an image on a recording medium such as paper. The image memory 207 stores an image read by the reading device 201 and compressed data of the image, and the like. The auxiliary storage device 208 stores various pieces of information. The auxiliary storage device 208 is, for example, a memory card and a hard disk drive (HDD). The NIC 209 is a device that communicates with the other devices connected to the image processing system 100.

Figure 3:
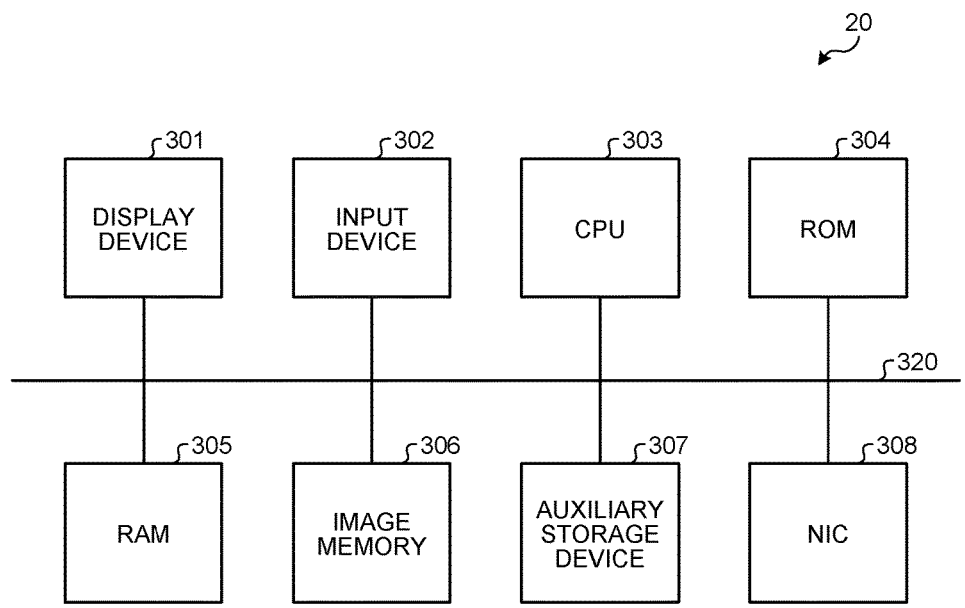
FIG. 3 is a diagram of a hardware configuration example of a server device according to the first embodiment.

FIG. 3 is a diagram of a hardware configuration example of the server device 20 according to the first embodiment. The server device 20 according to the first embodiment includes a display device 301, an input device 302, a CPU 303, a ROM 304, a RAM 305, an image memory 306, an auxiliary storage device 307, and a NIC 308. The display device 301, the input device 302, the CPU 303, the ROM 304, the RAM 305, the image memory 306, the auxiliary storage device 307, and the NIC 308 are connected to each other via a bus 320.

The display device 301 is a liquid crystal display that displays information, or the like. The input device 302 is a device that inputs information. The input device 302 is, for example, a keyboard and a mouse. The display device 301 and the input device 302 may be a liquid crystal touch panel or the like capable of display and input of information.

The CPU 303 executes programs, and thereby controls the operations of the server device 20. The ROM 304 stores programs and the like executed by the CPU 303. The RAM 305 temporarily stores information on a program when the CPU 303 executes the program. The image memory 306 stores an image read by the image processing device 10 and compressed data of the image, and the like. The auxiliary storage device 307 stores various pieces of information. The auxiliary storage device 308 is, for example, a memory card and HDD. The NIC 308 is a device that communicates with the other devices connected to the image processing system 100.

Figure 4:
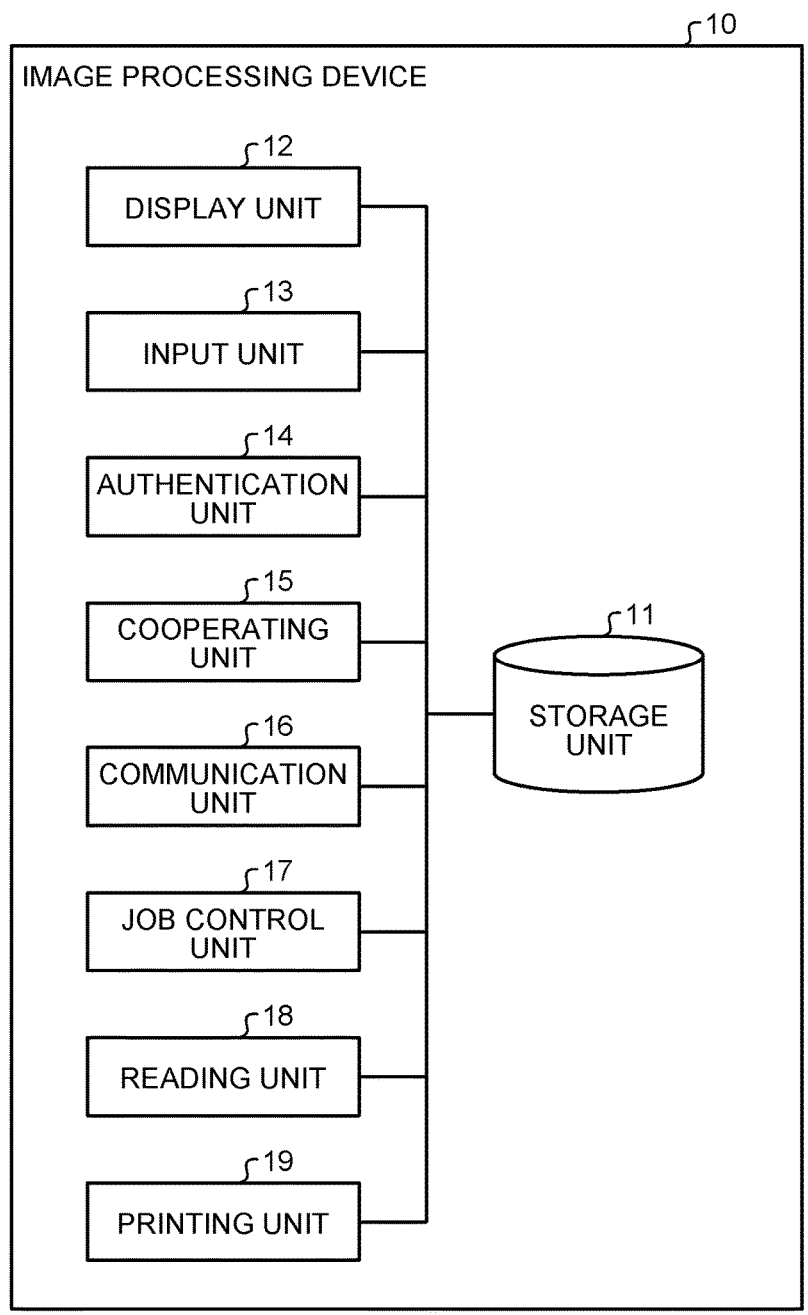
FIG. 4 is a diagram of a functional configuration example of the image processing device according to the first embodiment.

FIG. 4 is a diagram of a functional configuration example of the image processing device 10 according to the first embodiment. The image processing device 10 according to the first embodiment includes a storage unit 11, a display unit 12, an input unit 13, an authentication unit 14, a cooperating unit 15, a communication unit 16, a job control unit 17, a reading unit 18, and a printing unit 19.

The storage unit 11 stores information. The information stored in the storage unit 11 includes, for example, authentication method information and authentication information of each user using his/her own device, and performance information indicating the performance of each of the image processing devices 10. The authentication method information is information indicating an authentication method of the user. The authentication method information is information indicating, for example, a user ID and password combination system or a passcode system. The authentication information is, for example, a user ID and password, or a personal identification number. The performance information stores, for example, types of functions that the own device has, available sizes of print paper, information as to whether or not color printing is supported, information as to whether or not duplex printing is supported, and PPM for each of the image processing devices 10.

The display unit 12 displays information such as a display screen that receives an input indicating an operation performed on the image processing device 10 from the user of the image processing system 100.

The input unit 13 receives an input or the like indicating an operation performed on the image processing device 10 from the user of the image processing system 100. The display unit 12 and the input unit 13 are implemented by using the operation panel 202 (see FIG. 2).

The input unit 13 receives, for example, authentication information for authenticating the user of the image processing system 100 based on the authentication method according to the setting of the image processing device 10. The authentication method may be arbitrary. For example, when the authentication method is a user ID and password method, the input unit 13 receives the authentication information based on the combination of the user ID and the password. Moreover, for example, when the authentication method is the passcode system, the input unit 13 receives the authentication information based on the passcode system. When receiving the authentication information from the user of the image processing system 100, the input unit 13 inputs the authentication information to the authentication unit 14.

When receiving the authentication information from the input unit 13, the authentication unit 14 uses the authentication information to perform authentication of the own device. When the authentication unit 14 completes the login of the own device, the functions such as copy, which the own device has, become available.

When the cooperating unit 15 for using the functions of the other image processing device 10 from the own device is to be operated, the authentication unit 14 transmits an authentication request including the authentication information having been used for authentication of the own device to the other image processing device 10 via the server device 20. Thereby, the authentication unit 14 performs authentication on the other image processing device 10 from the own device. At this time, when the authentication to the other image processing device 10 based on the authentication information is impossible, the authentication unit 14 transmits a transmission request of the authentication method information to the other image processing device 10 via the server device 20, and thereby checks the authentication method of the other image processing device 10.

Thereby, the checking of the authentication method is not performed on the other image processing devices, the user authentication to which has succeeded based on the authentication information having been used for the authentication of the own device, thus reducing the time required for the activation of the cooperation function. In other words, the checking of the authentication method is performed on the other image processing device, the user authentication to which is impossible based on the authentication information having been used for the authentication of the own device, thus reducing the time required for the activation of the cooperation function.

When receiving the authentication request from the server device 20 through the communication unit 16, the authentication unit 14 determines whether login to the own device is possible based on the authentication information included in the authentication request, and sends back the authentication result to the server device 20.

When receiving the transmission request of the authentication method information from the server device 20 through the communication unit 16, the authentication unit 14 acquires the authentication method information of the user from the storage unit 11, and sends back the authentication method information to the server device 20.

The cooperating unit 15 performs control related to the cooperation function for using the functions of the other image processing device 10 from the own device. For example, when the cooperation function of the own device is activated, the cooperating unit 15 displays the functions available in the image processing system 100 on the display unit 12 based on the performance information stored in the storage unit 11. For example, even if an OCR function is not provided in the own device, the cooperating unit 15 uses the OCR function of the other image processing device 10 from the own device, and can thereby extract character string data from a document read by the own device.

The communication unit 16 communicates with the other devices connected to the image processing system 100 in response to the request from the other functional block of the image processing device 10. The job control unit 17 generates a job such as a copy job and a printer job according to the information received from the user of the image processing system 100 through the input unit 13, and executes the job. The reading unit 18 reads the document. The printing unit 19 prints the document.

The image processing device 10 may further include a FAX unit that controls a FAX function and an OCR unit that controls an OCR function, or the like.

Figure 5:
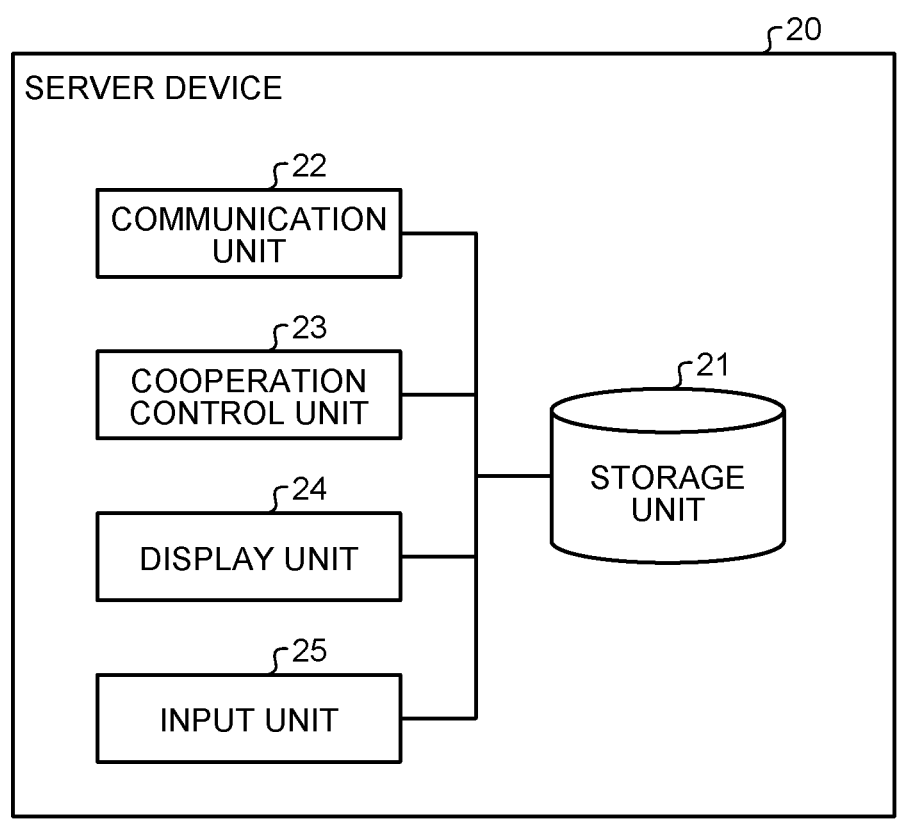
FIG. 5 is a diagram of a functional configuration example of the server device according to the first embodiment.

FIG. 5 is a diagram of a functional configuration example of the server device 20 according to the first embodiment. The server device 20 according to the first embodiment includes a storage unit 21, a communication unit 22, a cooperation control unit 23, a display unit 24, and an input unit 25.

The storage unit 21 stores information. The information stored in the storage unit 21 is, for example, specification information for specifying each of the image processing devices 10. The specification information is, for example, an image processing device name and IP address.

The communication unit 22 communicates with the other devices connected to the image processing system 100. The communication unit 22 receives, from, for example, an image processing device 10 (e.g., image processing device 10-1), an authentication request for the other image processing devices 10 (e.g., image processing devices 10-2 to 10-N) and a transmission request of the authentication method information of the other image processing devices 10.

The cooperation control unit 23 performs control when two or more image processing devices 10 of the image processing system 100 are made to cooperate with each other.

When receiving the authentication request for the other image processing devices 10 (e.g., image processing devices 10-2 to 10-N) from, for example, the image processing device 10 (e.g., image processing device 10-1) through the communication unit 22, the cooperation control unit 23 acquires the specification information for specifying each of the other image processing devices 10 from the storage unit 21 and uses the specification information to transmit the authentication request. In addition, the cooperation control unit 23 sends back an authentication result received from each of the other image processing devices 10 to the image processing device 10 having transmitted the authentication request for the other image processing devices 10.

When receiving the transmission request of the authentication method information of the other image processing device 10 from, for example, the image processing device 10 (e.g., image processing device 10-1) through the communication unit 22, the cooperation control unit 23 acquires the specification information for specifying the other image processing device 10 from the storage unit 21 and uses the specification information to transmit the transmission request of the authentication method information. In addition, the cooperation control unit 23 sends back the authentication method information received from the other image processing device 10 to the image processing device 10 having transmitted the transmission request of the authentication method information of the other image processing device 10.

The display unit 24 displays information indicating a status or the like of the server device 20. The input unit 25 receives an input indicating an operation of the server device 20.

An example of the authentication method according to the first embodiment will be explained next. A case where the user of the image processing system 100 operates the image processing device 10-1 will be explained as an example.

Figure 6:
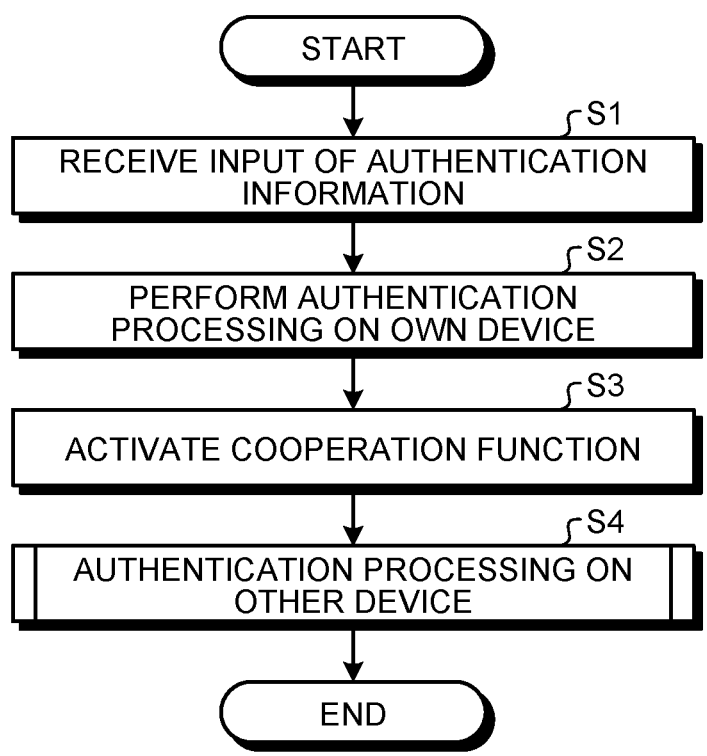
FIG. 6 is a flowchart of an example of an authentication method of the image processing system according to the first embodiment.

FIG. 6 is a flowchart of an example of an authentication method of the image processing system 100 according to the first embodiment. First of all, the input unit 13 of the image processing device 10-1 receives the authentication information for authenticating the user of the image processing system 100 based on the authentication method according to the setting of the image processing device 10-1 (Step S1).

Figure 7:
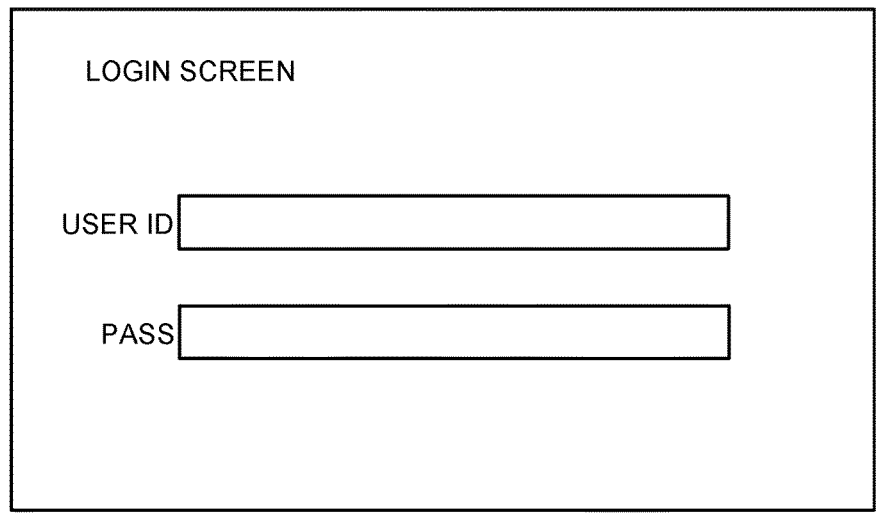
FIG. 7 is a diagram of an example of a login screen according to the first embodiment.

FIG. 7 is a diagram of an example of a login screen according to the first embodiment. The example of FIG. 7 represents a case where the authentication method is the user ID and password method. The display unit 12 of the image processing device 10-1 displays the login screen illustrated in FIG. 7, and the input unit 13 of the image processing device 10-1 receives the combination of the user ID and password as the authentication information via the login screen.

Subsequently, the authentication unit 14 of the image processing device 10-1 uses the authentication information received at Step S1 to perform authentication processing on the own device (image processing device 10-1) (Step S2). For example, when the login screen of FIG. 7 is displayed by the display unit 12 and if the combination of the user ID and password previously stored in the storage unit 11 of the image processing device 10-1 and the combination of the user ID and password received at Step S1 as the authentication information match each other, the authentication unit 14 of the image processing device 10-1 allows login to the image processing device 10-1.

Subsequently, when the input unit 13 of the image processing device 10-1 receives an input indicating activation of the cooperation function from the user of the image processing system 100, the cooperating unit 15 of the image processing device 10-1 starts the activation of the cooperation function (Step S3).

Figure 8:
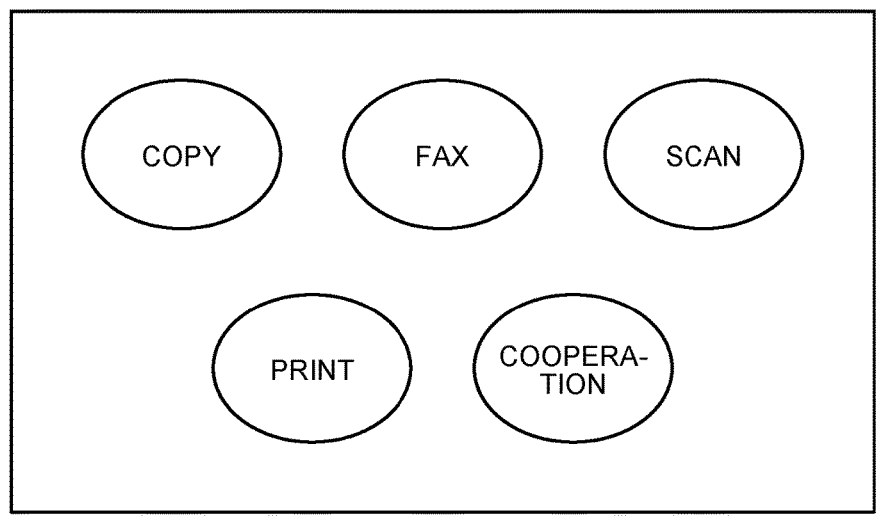
FIG. 8 is a diagram of an example of a function selection screen according to the first embodiment.

FIG. 8 is a diagram of an example of a function selection screen according to the first embodiment. The example of FIG. 8 represents a case where Copy, FAX, Scan, Print, and Cooperation functions are provided as functions that can be selected by the image processing device 10-1. The Copy, FAX, Scan, and Print represent the functions that can be implemented only by the image processing device 10-1. The cooperation function represents a function of cooperation between the functions of the own device and the functions of the other image processing devices 10. The input unit 13 of the image processing device 10-1 receives an input indicating activation of the cooperation function through the function selection screen displayed on the display unit 12.

Referring back to FIG. 6, when the cooperating unit 15 of the image processing device 10-1 requests the authentication processing for the other device from the authentication unit 14 of the image processing device 10-1, the authentication unit 14 of the image processing device 10-1 performs the authentication processing on the other device (Step S4).

The authentication processing performed on the other device at Step S4 will be explained next with reference to FIG. 9.

Figure 9:
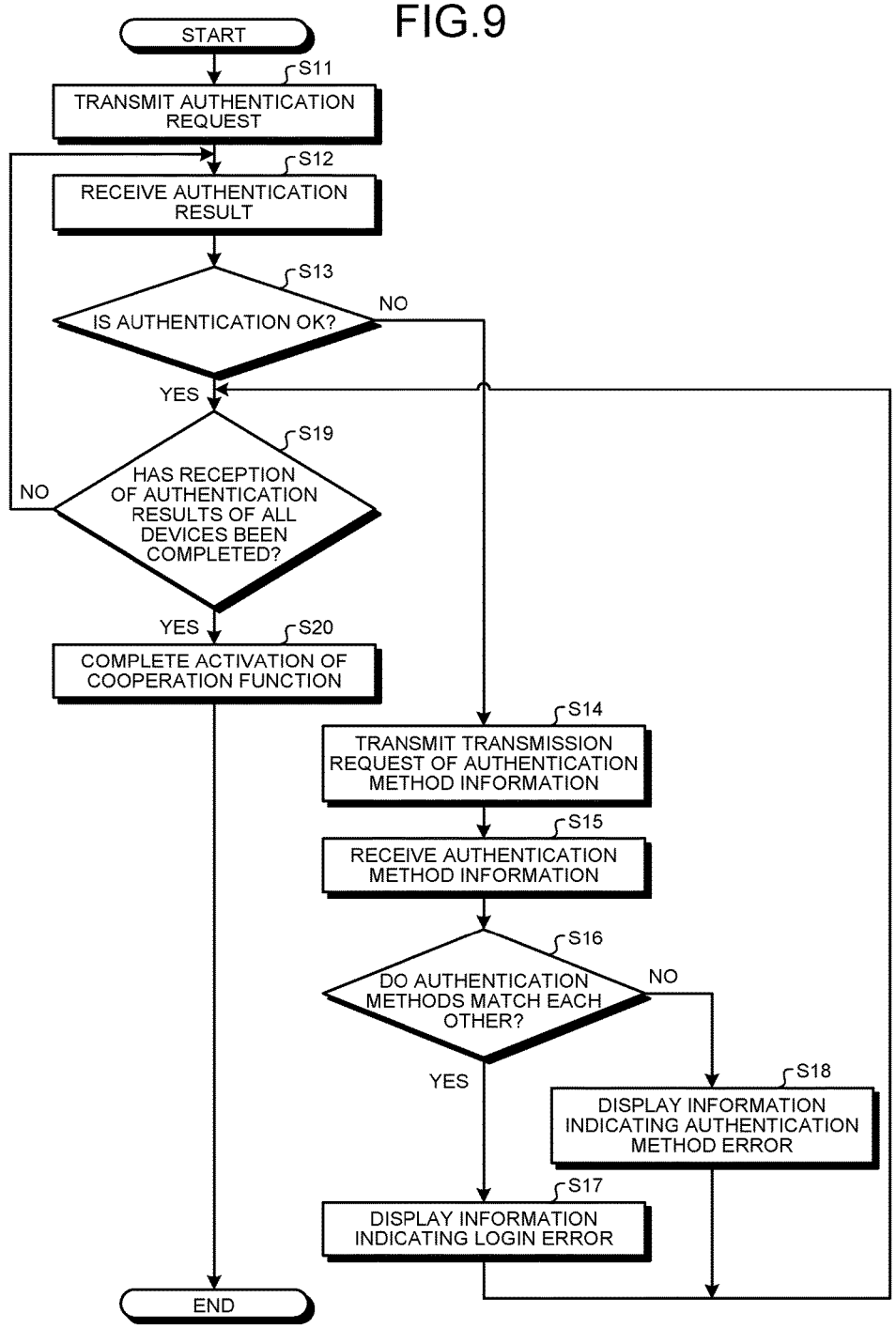
FIG. 9 is a flowchart of an example of authentication processing according to the first embodiment performed on other device.

FIG. 9 is a flowchart of an example of the authentication processing according to the first embodiment performed on the other device. First of all, the authentication unit 14 of the image processing device 10-1 transmits an authentication request including the authentication information having been used for the authentication of the own device to the server device 20 through the communication unit 16 of the image processing device 10-1 (Step S11). How the server device 20 operates when receiving the authentication request will be explained later with reference to FIG. 15.

Subsequently, the authentication unit 14 of the image processing device 10-1 receives an authentication result of each of the image processing devices 10 from the server device 20 through the communication unit 16 of the image processing device 10-1 (Step S12)

Then, the authentication unit 14 of the image processing device 10-1 determines whether the authentication result received at Step S12 is OK (Step S13).

When the authentication result is OK (Yes at Step S13), the authentication unit 14 of the image processing device 10-1 proceeds to the processing of Step S19.

When the authentication result is not OK (No at Step S13), the authentication unit 14 of the image processing device 10-1 transmits a transmission request of the authentication method information, used in an image processing device 10 in which the authentication result is not OK, to the server device 20 through the communication unit 16 of the image processing device 10-1 (Step S14). How the server device 20 operates when receiving the transmission request of the authentication method information will be explained later with reference to FIG. 17.

Subsequently, the authentication unit 14 of the image processing device 10-1 receives the authentication method information from the server device 20 through the communication unit 16 of the image processing device 10-1 (Step S15). Then, the authentication unit 14 of the image processing device 10-1 determines whether the authentication method of the own device and the authentication method indicated by the authentication method information received at Step S15 match each other (Step S16).

When the authentication methods match each other (Yes at Step S16), the authentication unit 14 of the image processing device 10-1 displays the information indicating a login error on the display unit 12 (Step S17), and proceeds to the processing of Step S19.

Figure 10:
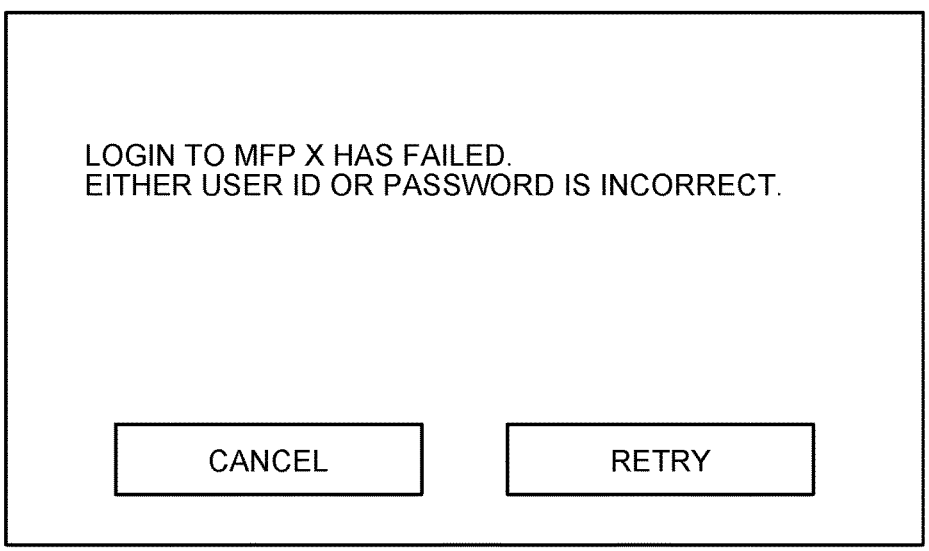
FIG. 10 is a diagram of a display example of a login error according to the first embodiment.

FIG. 10 is a diagram of a display example of a login error according to the first embodiment. The example of FIG. 10 represents a case where, because the user ID or the password of "MFP X" as the image processing device name is incorrect, the login to "MFP X" has failed. When "Cancel" is pressed, the authentication unit 14 of the image processing device 10-1 maintains the state of the login error to "MFP X". When "Retry" is pressed, the authentication unit 14 of the image processing device 10-1 transmits the authentication request including the user ID and the password input again to "MFP X" through the communication unit 16 of the image processing device 10-1.

Referring back to FIG. 9, when the authentication methods do not match each other (No at Step S16), the authentication unit 14 of the image processing device 10-1 displays the information indicating an authentication method error on the display unit 12 (Step S18), and proceeds to the processing of Step S19.

Figure 11:
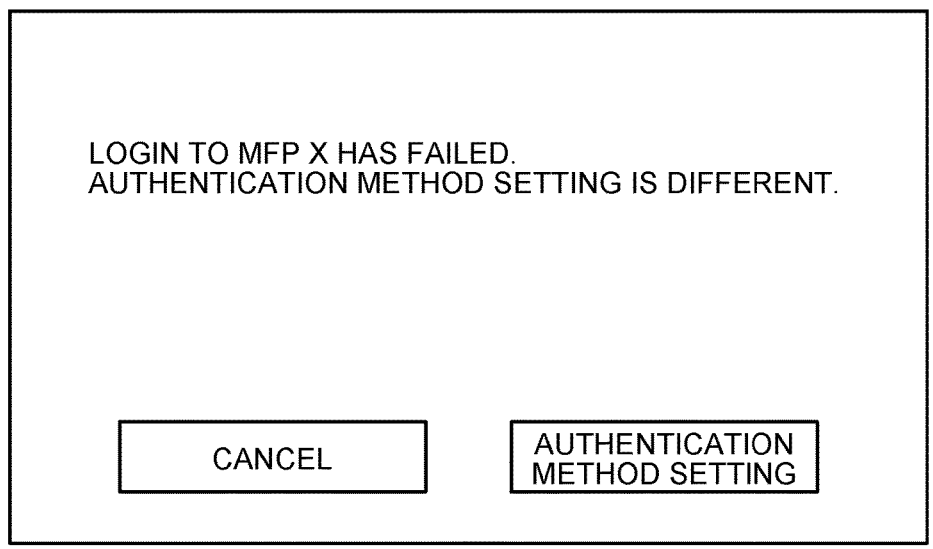
FIG. 11 is a diagram of a display example of an authentication method error according to the first embodiment.

FIG. 11 is a diagram of a display example of an authentication method error according to the first embodiment. The example of FIG. 11 represents a case where, because authentication method setting of "MFP X" as the image processing device name is different, the login to "MFP X" has failed. When "Cancel" is pressed, the authentication unit 14 of the image processing device 10-1 maintains the state of the authentication method error to "MFP X". When "Authentication method setting" is pressed, the authentication unit 14 of the image processing device 10-1 transmits an authentication request including authentication information (e.g., passcode) changed by using a changed authentication method (e.g., passcode system) to "MFP X" through the communication unit 16 of the image processing device 10-1.

Referring back to FIG. 9, the authentication unit 14 of the image processing device 10-1 determines whether authentication results have been received from all the image processing devices 10-2 to 10-N(Step S19). The authentication unit 14 of the image processing device 10-1 determines whether the authentication results have been received from all the image processing devices 10-2 to 10-N by referring to a flag or the like indicating the last authentication result assigned by the server device 20 that sends back the authentication results.

When not all the authentication results have been received from all the image processing devices 10-2 to 10-N (No at Step S19), the authentication unit 14 of the image processing device 10-1 returns to the processing of Step S12. When the authentication results have been received from all the image processing devices 10-2 to 10-N(Yes at Step S19), the authentication unit 14 of the image processing device 10-1 inputs the respective authentication results of the image processing devices 10-2 to 10-N to the cooperating unit 15 of the image processing device 10-1, and completes the activation of the cooperation function (Step S20).

Figure 12:
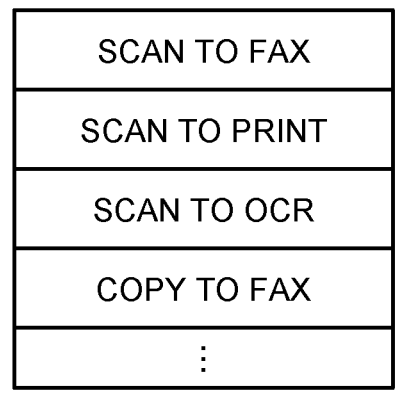
FIG. 12 is a diagram of a display example of a selection screen after activation of a cooperation function according to the first embodiment.

FIG. 12 is a diagram of a display example of a selection screen after the activation of the cooperation function according to the first embodiment. For example, "Scan to FAX" is selected when scanning is performed by the image processing device 10-1 and a FAX function of any one the image processing devices 10-2 to 10-N is used.

Figure 13:
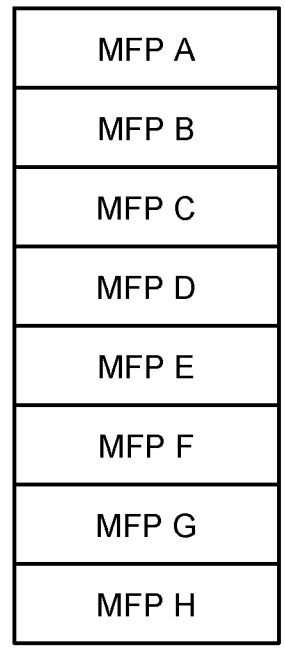
FIG. 13 is a diagram of an example of a device selection screen (a case with no error) according to the first embodiment.

FIG. 13 is a diagram of an example of a device selection screen (a case with no error) according to the first embodiment. The example of FIG. 13 represents a case where "MFP A" to "MFP H" as the image processing devices 10 that can be used as partners are displayed on the display unit 12 of the image processing device 10-1. For example, when "Scan to FAX" is selected on the selection screen of FIG. 12, the cooperating unit 15 of the image processing device 10-1 refers to the performance information stored in the storage unit 11 of the image processing device 10-1 to display the device selection screen of FIG. 13, as the image processing device including the FAX function, on the display unit 12 of the image processing device 10-1. The example of FIG. 13 represents a case where login to all the "MFP A" to "MFP H" can be performed.

Figure 14:
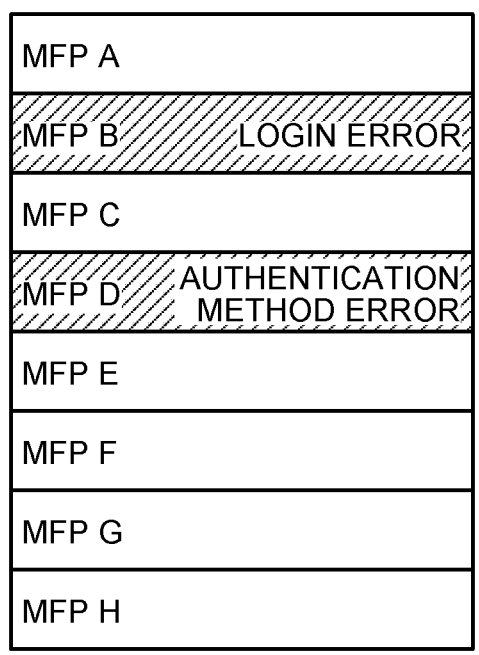
FIG. 14 is a diagram of an example of the device selection screen (a case with an error) according to the first embodiment.

On the other hand, FIG. 14 is a diagram of an example of a device selection screen (a case with an error) according to the first embodiment. The example of FIG. 14 represents a case where "MFP A" to "MFP H" as the image processing devices 10 that can be used as partners are displayed on the display unit 12 of the image processing device 10-1. For example, when "Scan to FAX" is selected on the selection screen of FIG. 12, the cooperating unit 15 of the image processing device 10-1 refers to the performance information stored in the storage unit 11 of the image processing device 10-1 to display the device selection screen of FIG. 14, as the image processing device having the FAX function, on the display unit 12 of the image processing device 10-1. The example of FIG. 14 represents a case where "MFP B" cannot be used because of the login error. In addition, the example of FIG. 14 represents a case where "MFP D" cannot be used because of the authentication method error.

By displaying the device selection screen of FIG. 14, the image processing device 10 in which the login error or the authentication method error occurs can be shown to the user of the image processing system 100. Therefore, the processing of displaying the information indicating the login error at Step S17 (see FIG. 10) and the processing of displaying the information indicating the authentication method error at Step S18 (see FIG. 11) may be omitted.

The authentication unit 14 of the image processing device 10-1 may be configured not to determine the type of error without performing Step S14 to Step S18.

How the server device 20 according to the first embodiment operates will be explained next.

First of all, a case where the server device 20 receives an authentication request for the other image processing device 10 from the image processing device 10 will be explained below. Specifically, a case where the image processing device 10-1 transmits an authentication request for each of the image processing devices 10-2 to 10-N to the server device 20 will be explained as an example.

Figure 15:
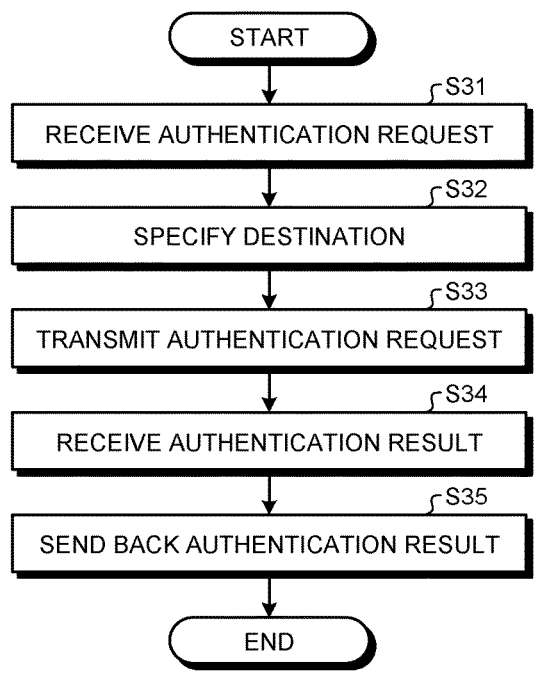
FIG. 15 is a flowchart of an example of how the server device according to the first embodiment operates when receiving an authentication request.

FIG. 15 is a flowchart of an example of how the server device 20 according to the first embodiment operates when receiving an authentication request. First of all, the cooperation control unit 23 receives the authentication request for each of the image processing devices 10-2 to 10-N from the image processing device 10-1 through the communication unit 22 (Step S31). Then, the cooperation control unit 23 acquires specification information for specifying each of the image processing devices 10-2 to 10-N from the storage unit 21, and specifies a destination of the authentication request received at Step S31 (Step S32). The cooperation control unit 23 then transmits the authentication request to each of the image processing devices 10-2 to 10-N through the communication unit 22 (Step S33).

Subsequently, the cooperation control unit 23 receives an authentication result from each of the image processing devices 10-2 to 10-N through the communication unit 22 (Step S34). Then, the cooperation control unit 23 sends back the authentication results received at Step S34 to the image processing device 10-1 through the communication unit 22 (Step S35). The unit of transmission of the authentication results may be arbitrary. The cooperation control unit 23 may transmit all of authentication results at a time, may collectively transmit every two or more authentication results, or may transmit authentication results one by one.

Figure 16:
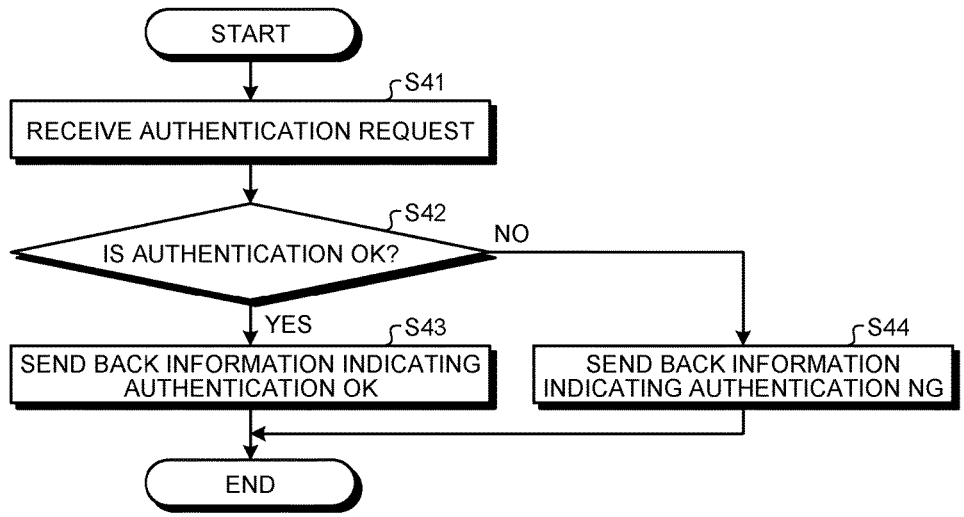
FIG. 16 is a flowchart of an example of how the image processing device according to the first embodiment operates when receiving an authentication request.

FIG. 16 is a flowchart of an example of how the image processing device 10 according to the first embodiment operates when receiving an authentication request. A case where the image processing device 10-2 receives an authentication request from the server device 20 will be explained as an example. First of all, the authentication unit 14 of the image processing device 10-2 receives an authentication request from the server device 20 through the communication unit 16 (Step S41).

Then, the authentication unit 14 of the image processing device 10-2 determines whether login to the own device (image processing device 10-2) is possible based on the authentication information included in the authentication request (Step S42). For example, when the authentication information is a user ID and password combination, the authentication unit 14 of the image processing device 10-2 allows the login to the image processing device 10-2 when the user ID and password combination previously stored in the storage unit 11 of the image processing device 10-2 and the user ID and password combination included in the authentication request received at Step S41 match each other (Authentication: OK).

When the login to the image processing device 10-2 is possible (Yes at Step S42), the authentication unit 14 of the image processing device 10-2 sends back the information indicating Authentication OK to the server device 20 through the communication unit 16 (Step S43).

When the login to the image processing device 10-2 has failed (No at Step S42), the authentication unit 14 of the image processing device 10-2 sends back the information indicating Authentication NG to the server device 20 through the communication unit 16 (Step S44).

A case where the server device 20 receives an authentication request of authentication method information of any other image processing device 10 from an image processing device 10 will be explained next. Specifically, a case where the image processing device 10-1 transmits a transmission request of authentication method information of the image processing device 10-2 to the server device 20 will be explained below as an example.

Figure 17:
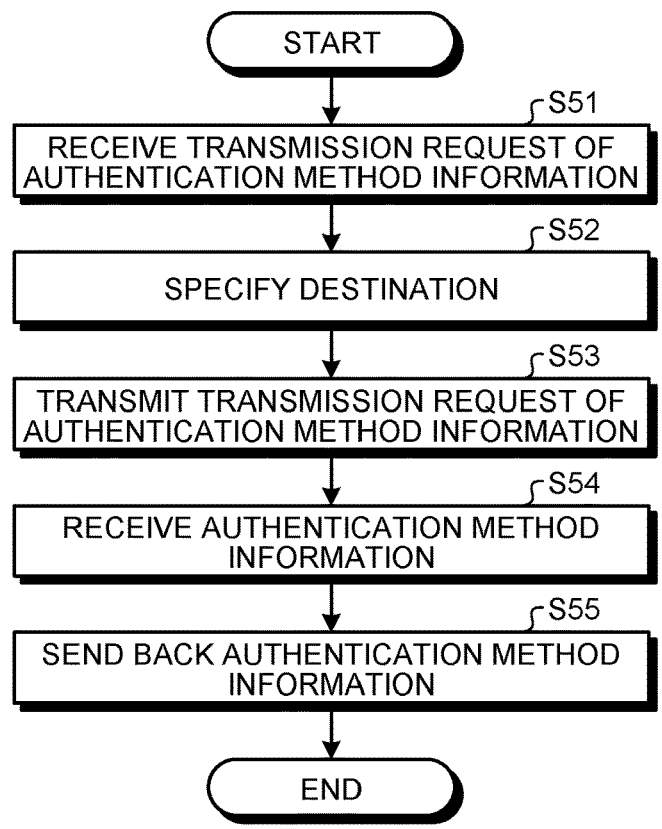
FIG. 17 is a flowchart of an example of how the server device according to the first embodiment operates when receiving a transmission request of authentication method information.

FIG. 17 is a flowchart of an example of how the server device 20 according to the first embodiment operates when receiving a transmission request of authentication method information. First of all, the cooperation control unit 23 receives the transmission request of authentication method information for the image processing device 10-2 from the image processing device 10-1 through the communication unit 22 (Step S51). Then, the cooperation control unit 23 acquires specification information for specifying the image processing device 10-2 from the storage unit 21, and specifies a destination of the transmission request received at Step S51 (Step S52). The cooperation control unit 23 then transmits the transmission request of the authentication method information to the image processing device 10-2 through the communication unit 22 (Step S53).

Subsequently, the cooperation control unit 23 receives the authentication method information from the image processing device 10-2 through the communication unit 22 (Step S54). Then, the cooperation control unit 23 sends back the authentication method information received at Step S54 to the image processing device 10-1 through the communication unit 22 (Step S55).

Figure 18:
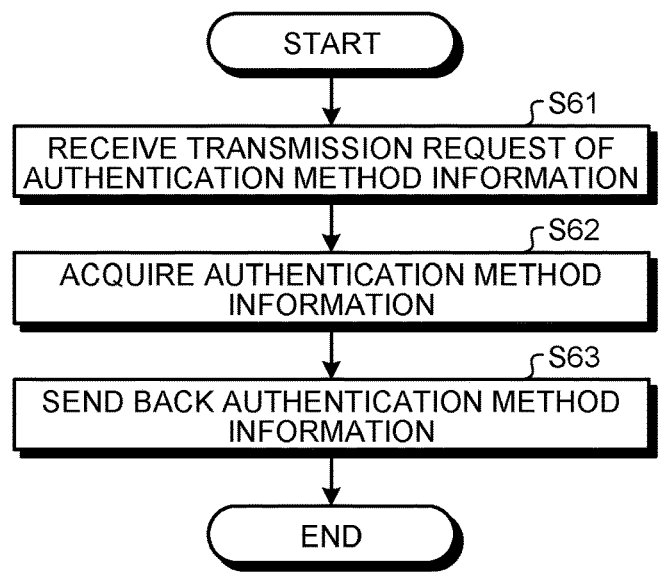
FIG. 18 is a flowchart of an example of how the image processing device according to the first embodiment operates when receiving a transmission request of authentication method information.

FIG. 18 is a flowchart of an example of how the image processing device 10 according to the first embodiment operates when receiving a transmission request of authentication method information. A case where the image processing device 10-2 receives a transmission request of the authentication method information from the server device 20 will be explained below as an example. First of all, the authentication unit 14 of the image processing device 10-2 receives the transmission request of authentication method information from the server device 20 through the communication unit 16 (Step S61).

Then, the authentication unit 14 of the image processing device 10-2 acquires the authentication method information of the user from the storage unit 11 (Step S62) Subsequently, the authentication unit 14 of the image processing device 10-2 sends back the authentication method information acquired at Step S62 to the server device 20 (Step S63).

As explained above, in the image processing system 100 according to the first embodiment, when the cooperating unit 15 is to be operated, the authentication unit 14 of the image processing device 10 (e.g., image processing device 10-1) transmits the authentication information having been used for the own device to the other image processing device 10 (e.g., image processing devices 10-2 to 10-N) to perform authentication on the other image processing device 10. When the authentication to the other image processing device 10 based on the authentication information having been used for the own device is impossible, the authentication unit 14 of the image processing device 10 checks with the other image processing device 10 about the authentication method.

Thereby, the checking of the authentication method is not performed on the other image processing devices 10, the user authentication to which has succeeded based on the authentication information having been used for the authentication of the own device, thus reducing the time required for the activation of the cooperation function.

A second embodiment will be explained next. In the explanation of the second embodiment, a portion different from the portion explained in the first embodiment is explained, but explanation the same as that of the first embodiment is omitted. The second embodiment is configured so that a functional configuration of the server device 20 is different from that of the first embodiment.

Figure 19:
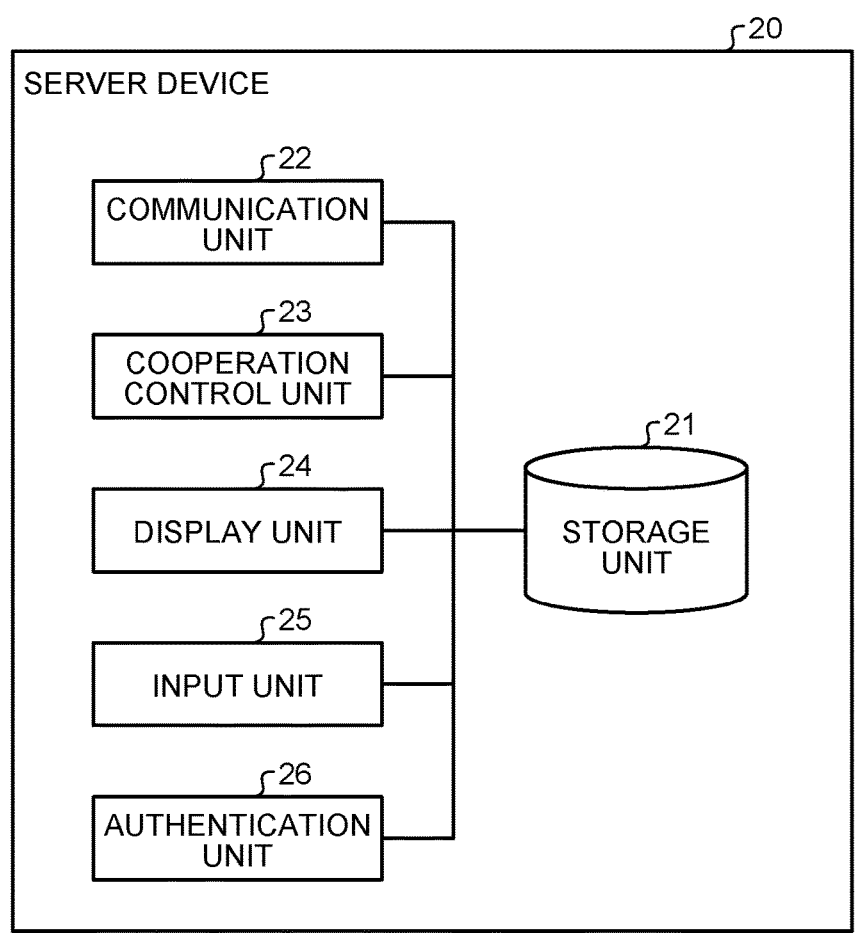
FIG. 19 is a diagram of a functional configuration example of the server device according to a second embodiment.

FIG. 19 is a diagram of a functional configuration example of the server device 20 according to the second embodiment. The server device 20 according to the second embodiment includes the storage unit 21, the communication unit 22, the cooperation control unit 23, the display unit 24, the input unit 25, and an authentication unit 26. The server device 20 according to the second embodiment is such that the authentication unit 26 is added to the configuration of the server device 20 according to the first embodiment. The control processing related to authentication performed by the cooperation control unit 23 according to the first embodiment is performed by the authentication unit 26 according to the second embodiment.

The storage unit 21 stores information. The information stored in the storage unit 21 includes, for example, specification information for specifying each of the image processing devices 10. The specification information is, for example, an image processing device name and IP address.

The communication unit 22 communicates with the other devices connected to the image processing system 100. The communication unit 22 receives an authentication request for the other image processing devices 10 from, for example, the image processing device 10.

The cooperation control unit 23 performs control when two or more image processing devices 10 of the image processing system 100 are made to cooperate with each other.

The display unit 24 displays information indicating a status or the like of the server device 20. The input unit 25 receives an input indicating an operation of the server device 20.

The authentication unit 26 acquires, when receiving an authentication request for the other image processing devices 10 (e.g., image processing devices 10-2 to 10-N) from an image processing device 10 (e.g., image processing device 10-1) through the communication unit 22, the specification information for specifying each of the other image processing devices 10 from the storage unit 21, and uses the specification information to transmit the authentication request. The authentication unit 26 sends back an authentication result received from each of the other image processing devices 10 to the image processing device 10.

When the authentication result of the authentication request is NG, the authentication unit 26 transmits a transmission request of authentication method information used in the image processing device 10, whose authentication result is NG, to the image processing device 10 through the communication unit 22, and thereby checks the authentication method of the image processing device 10.

How the server device 20 according to the second embodiment operates will be explained next. A case where the image processing device 10-1 transmits an authentication request for the image processing devices 10-2 to 10-N to the server device 20 will be explained below as an example.

Figure 20:
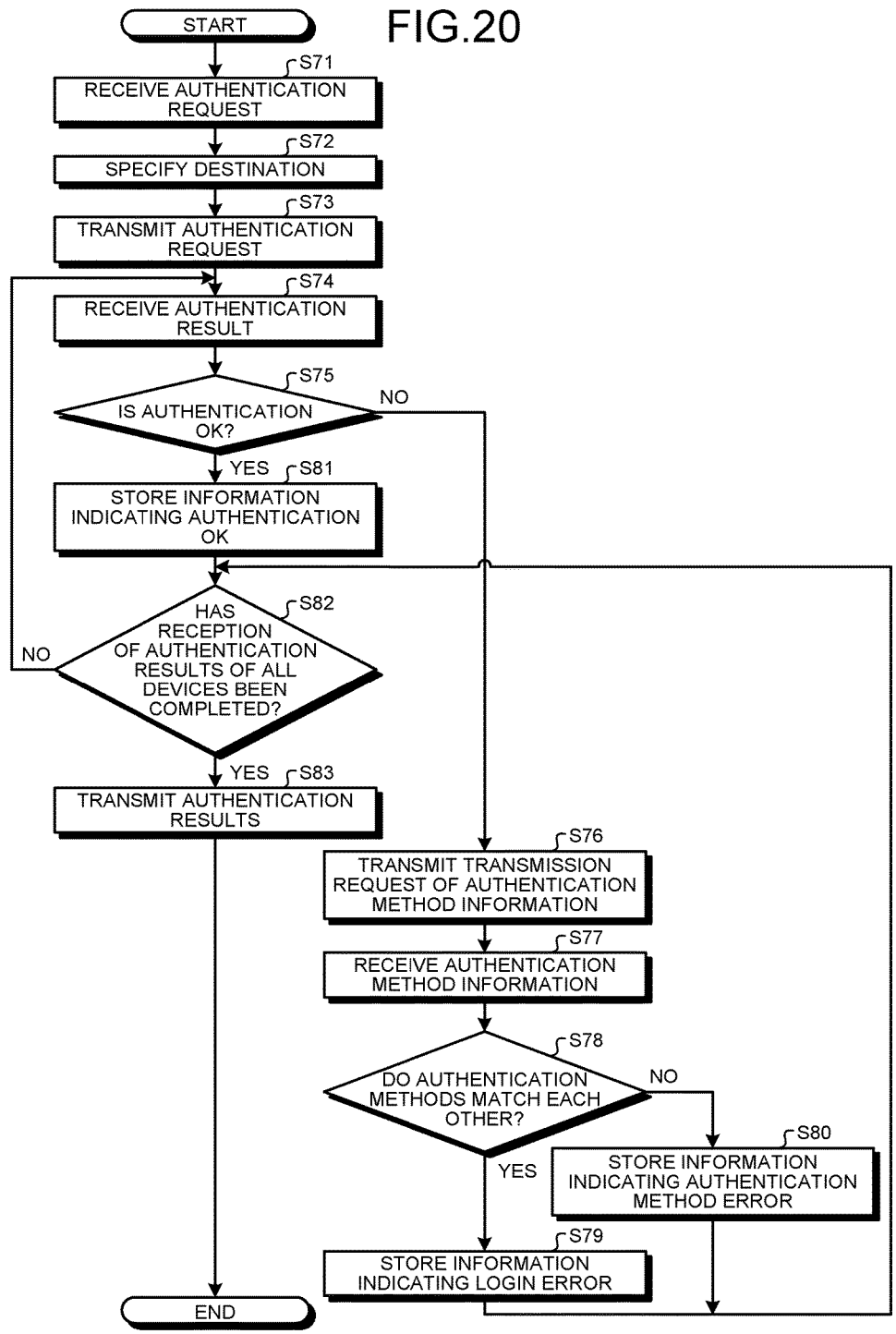
FIG. 20 is a diagram of an example of how the server device according to the second embodiment operates.

FIG. 20 is a diagram of an example of how the server device 20 according to the second embodiment operates. First of all, the authentication unit 26 of the server device 20 receives an authentication request for each of the image processing devices 10-2 to 10-N from the image processing device 10-1 through the communication unit 22 (Step S71). Then, the authentication unit 26 of the server device 20 acquires specification information for specifying each of the image processing devices 10-2 to 10-N from the storage unit 21, and specifies a destination of the authentication request received at Step S71 (Step S72). The authentication unit 26 of the server device 20 then transmits the authentication request to each of the image processing devices 10-2 to 10-N through the communication unit 22 (Step S73).

Subsequently, the authentication unit 26 of the server device 20 receives an authentication result from each of the image processing devices 10-2 to 10-N through the communication unit 22 (Step S74).

Then, the authentication unit 26 of the server device 20 determines whether the authentication result received at Step S74 is OK (Step S75).

When the authentication result is OK (Yes at Step S75), the authentication unit 26 of the server device 20 stores the information indicating Authentication OK (Step S81), and proceeds to the processing of Step S82.

When the authentication result is not OK (No at Step S75), the authentication unit 26 of the server device 20 transmits a transmission request of the authentication method information used in the image processing device 10 whose authentication result is not OK to the image processing device 10 through the communication unit 22 of the server device 20 (Step S76).

Subsequently, the authentication unit 26 of the server device 20 receives the authentication method information from the image processing device 10 as a destination of the transmission request of the authentication method information transmitted at Step S76 through the communication unit 22 of the server device 20 (Step S77).

Then, the authentication unit 26 of the server device 20 determines whether the authentication method of the user of the image processing device 10-1 having transmitted the authentication request and the authentication method indicated by the authentication method information received at Step S77 match each other (Step S78). The authentication method of the user of the image processing device 10-1 is specified by the authentication unit 26 of the server device 20 from the authentication information of the user included in the authentication request. For example, when the authentication information included in the authentication request is the user ID and password, it is specified that the authentication method of the user specified by the user ID is a method of user ID and password combination.

When the authentication methods match each other (Yes at Step S78), the authentication unit 26 of the server device 20 stores the information indicating the login error in the storage unit 21 (Step S79), and proceeds to the processing of Step S82.

When the authentication methods does not match each other (No at Step S78), the authentication unit 26 of the server device 20 stores the information indicating the authentication method error in the storage unit 21 (Step S80), and proceeds to the processing of Step S82.

Subsequently, the authentication unit 26 of the server device 20 determines whether authentication results have been received from all the image processing devices 10-2 to 10-N(Step S82).

When not all the authentication results have been received from all the image processing devices 10-2 to 10-N (No Step S82), the authentication unit 26 of the server device 20 returns to the processing of Step S74.

When authentication results have been received from all the image processing devices 10-2 to 10-N(Yes Step S82), the authentication unit 26 of the server device 20 acquires the authentication result of each of the image processing devices 10-2 to 10-N from the storage unit 21, and transmits the authentication result of each of the image processing devices 10-2 to 10-N to the image processing device 10-1 (Step S83).

As explained above, according to the image processing system 100 of the second embodiment, for example, when the cooperating unit 15 of the image processing device 10-1 is to be operated, the authentication unit 26 of the server device 20 transmits the authentication information having been used in the image processing device 10-1 to the other image processing devices 10 (image processing devices 10-2 to 10-N), and thereby performs authentication on the other image processing devices 10. When the authentication to the other image processing device 10 based on the authentication information having been used in the image processing device 10-1 is impossible, the authentication unit 26 of the server device 20 checks with the other image processing device 10 about the authentication method.

Thereby, the checking of the authentication method is not performed on the other image processing devices 10, the user authentication to which has succeeded based on the authentication information having been used for the authentication of the own device, thus reducing the time required for activation of the cooperation function. The larger the number of image processing devices 10 included in the image processing system 100 is, the more the effect of reducing the activation time of the cooperation function is increased.

A third embodiment will be explained next. In the explanation of the third embodiment, a portion different from the portion explained in the first embodiment is explained, but explanation the same as that of the first embodiment is omitted. The third embodiment is configured so that a device configuration of the image processing system 100 is different from that of the first embodiment.

Figure 21:
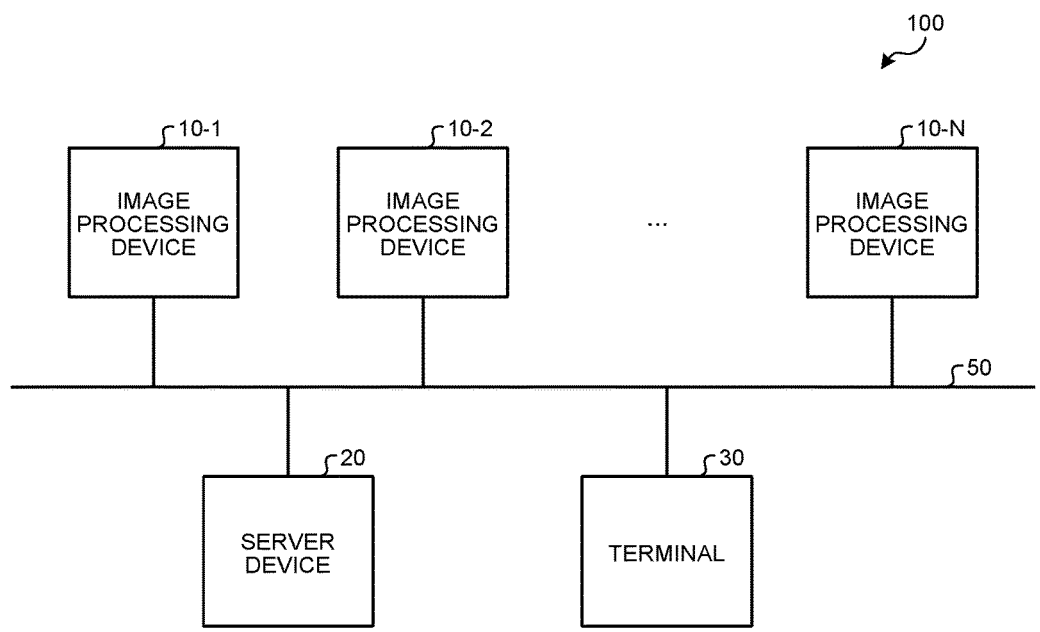
FIG. 21 is a diagram of a device configuration example of the image processing system according to a third embodiment.

FIG. 21 is a diagram of a device configuration example of the image processing system 100 according to the third embodiment. The image processing system 100 according to the third embodiment includes the image processing devices 10-1 to 10-N, the server device 20, and a terminal 30. The image processing system 100 according to the third embodiment is configured to add the terminal 30 to the device configuration of the first embodiment. Because a hardware configuration of the terminal 30 is the same as that of the server device 20 (see FIG. 3), the explanation thereof is omitted.

The terminal 30 is connected to an image processing device 10 (e.g., image processing device 10-1) using a communication system such as Wi-Fi Direct (registered trademark) and Bluetooth (registered trademark). This connection allows the user of the image processing system 100 to operate the image processing device 10 through not only the operation panel 202 (display unit 12 and input unit 13) of the image processing device 10 but also the terminal 30.

Figure 22:
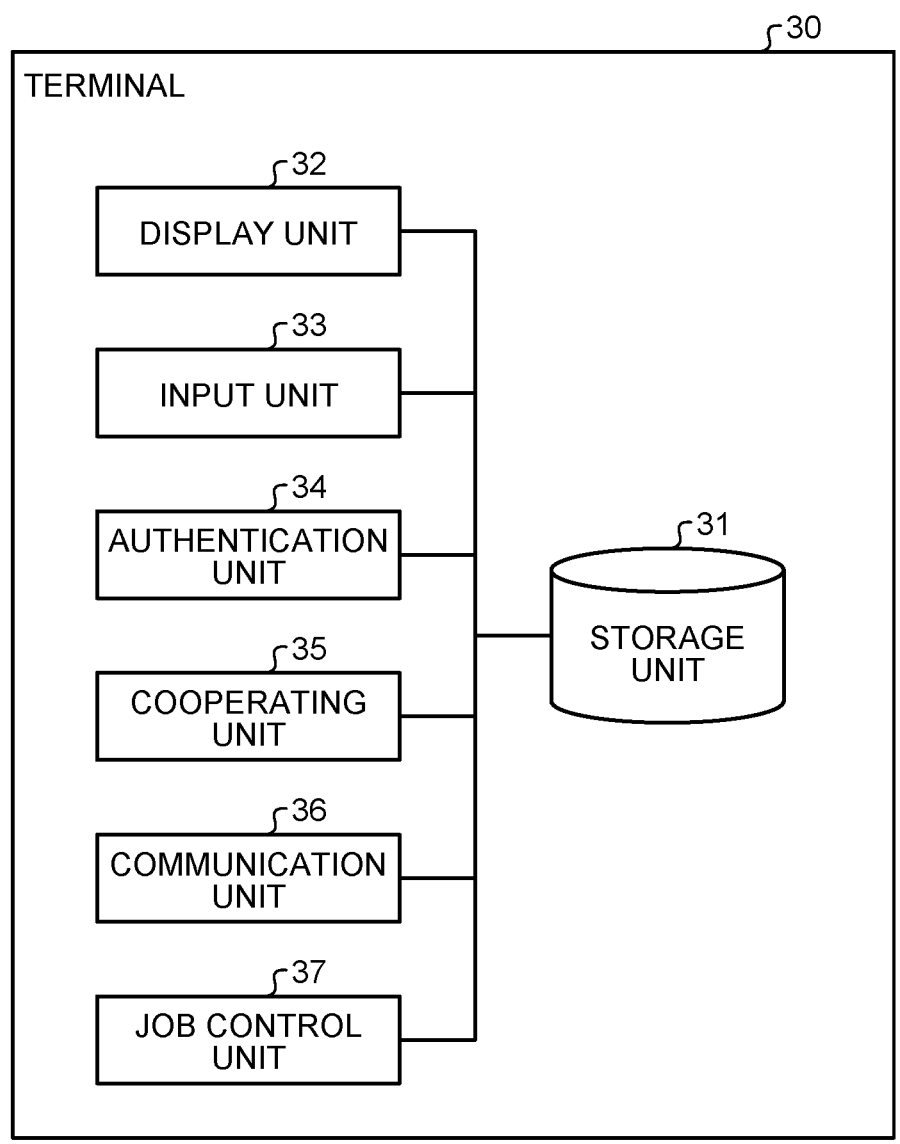
FIG. 22 is a diagram of a functional configuration example of a terminal according to the third embodiment.

FIG. 22 is a diagram of a functional configuration example of the terminal 30 according to the third embodiment. The terminal 30 according to the third embodiment includes a storage unit 31, a display unit 32, an input unit 33, an authentication unit 34, a cooperating unit 35, a communication unit 36, and a job control unit 37. A case where the terminal 30 is connected to the image processing device 10-1 will be explained below as an example.

The storage unit 31 stores information. The information stored in the storage unit 31 includes, for example, authentication method and authentication information of each user using the image processing device 10-1, and performance information indicating the performance of each of the image processing devices 10.

The display unit 32 displays information such as a display screen that receives an input indicating an operation performed on the image processing device 10-1 from the user of the image processing system 100. The input unit 33 receives an input or the like indicating an operation of the image processing device 10-1 from the user of the image processing system 100. The input unit 13 receives, for example, authentication information for authenticating the user of the image processing system 100 based on the authentication method according to the setting of the image processing device 10-1. When receiving the authentication information from the user of the image processing system 100, the input unit 13 inputs the authentication information to the authentication unit 34.

When receiving the authentication information from the input unit 33, the authentication unit 34 uses the authentication information to perform authentication of the image processing device 10-1. When the authentication unit 14 completes the login of the image processing device 10-1, the functions such as copying, which the image processing device 10-1 has, become available.

When the cooperating unit 35 is to be operated in order to use the functions of the other image processing devices 10 (image processing devices 10-2 to 10-N), the authentication unit 34 transmits an authentication request including the authentication information having been used for authentication of the image processing device 10-1 to the other image processing device 10 via the server device 20, and thereby performs authentication on the other image processing device 10. At this time, when the authentication to the other image processing device 10 based on the authentication information is impossible, the authentication unit 34 transmits a transmission request of the authentication method information to the other image processing device 10 via the server device 20, and thereby checks the authentication method of the other image processing device 10.

Thereby, the checking of the authentication method is not performed on the other image processing devices 10, the user authentication to which has succeeded based on the authentication information having been used for the authentication of the image processing device 10-1, thus reducing the time required for the activation of the cooperation function. In other words, the checking of the authentication method is performed on the other image processing device 10, the user authentication to which based on the authentication information having been used for the authentication of the image processing device 10-1 is impossible, thus reducing the time required for the activation of the cooperation function.

When receiving the authentication request from the server device 20 through the communication unit 36, the authentication unit 34 determines whether login to the image processing device 10-1 is possible based on the authentication information included in the authentication request, and sends back the authentication result to the server device 20.

When receiving the transmission request of the authentication method information from the server device 20 through the communication unit 36, the authentication unit 34 acquires the authentication method information of the user from the storage unit 31, and sends back the authentication method information to the server device 20.

The cooperating unit 35 performs control related to the cooperation function for using the functions of the other image processing devices 10 from the image processing device 10-1. For example, when the cooperation function of the image processing device 10-1 is activated, the cooperating unit 35 displays the functions available in the image processing system 100 on the display unit 32 based on the performance information stored in the storage unit 31. For example, even if the image processing device 10-1 does not have the OCR function, the cooperating unit 35 uses the OCR function of the other image processing devices 10 from the image processing device 10-1, and can thereby extract character string data from a document read by the image processing device 10-1.

The communication unit 36 communicates with the other devices connected to the image processing system 100 in response to the request from the other functional block of the terminal 30. The job control unit 37 generates a job such as a copy job and a printer job according to the information received from the user of the image processing system 100, and transmits the job to the image processing device 10-1 through the communication unit 36.

The example of the authentication processing of the terminal 30 according to the third embodiment is the same as that (see FIG. 9) of the image processing device 10 according to the first embodiment, and explanation thereof is therefore omitted.

As explained above, in the image processing system 100 according to the third embodiment, when the cooperating unit 35 is to be operated, the authentication unit 34 of the terminal 30 connected to the image processing device 10 (e.g., image processing device 10-1) transmits the authentication information having been used for the image processing device 10-1 to the other image processing devices 10 (e.g., image processing devices 10-2 to 10-N), and performs authentication on the other image processing devices 10. When the authentication to the other image processing device 10 based on the authentication information having been used in the image processing device 10 is impossible, the authentication unit 34 of the terminal 30 checks with the other image processing device 10 about the authentication method.

Thereby, the checking of the authentication method is not performed on the other image processing devices 10, the user authentication to which has succeeded based on the authentication information having been used for the authentication of the image processing device 10, thus further reducing the time required for the activation of the cooperation function.

The programs to be executed by the image processing device 10, the server device 20, and the terminal 30 are provided as computer program products by being stored in a computer-readable storage medium such as a compact disk read only memory (CD-ROM), a memory card, a compact disk recordable (CD-R), and a digital versatile disk (DVD) in a file of an installable format or of an executable format.

Moreover, it may be configured so that the programs to be executed by the image processing device 10, the server device 20, and the terminal 30 are provided by being stored on a computer connected to a network such as the Internet and being downloaded via the network. In addition, it may be configured so that the programs to be executed by the image processing device 10, the server device 20, and the terminal 30 are provided via a network such as the Internet without being downloaded.

It may also be configured so that the programs to be executed by the image processing device 10, the server device 20, and the terminal 30 are provided by being preinstalled into a ROM or the like.

The programs to be executed by the image processing device 10, the server device 20, and the terminal 30 have a module configuration including functional blocks that can be implemented by the program, out of the functional blocks. In the case of the image processing device 10, the functional blocks that can be implemented by the program are, for example, the display unit 12, the input unit 13, the authentication unit 14, the cooperating unit 15, the communication unit 16, and the job control unit 17. In the case of the server device 20, the functional blocks that can be implemented by the program are, for example, the communication unit 22, the cooperation control unit 23, the display unit 24, the input unit 25, and the authentication unit 26. In the case of the terminal 30, the functional blocks that can be implemented by the program are, for example, the display unit 32, the input unit 33, the authentication unit 34, the cooperating unit 35, the communication unit 36, and the job control unit 37.

In the case of the image processing device 10, the functional blocks to be implemented by the program are executed by the CPU 203 reading the program from a recording medium such as the auxiliary storage device 208, so that the functional blocks to be implemented by the program are loaded to the RAM 205. In other words, the functional blocks to be implemented by the program are generated on the RAM 205.

In the cases of the server device 20 and the terminal 30, the functional blocks to be implemented by the program are executed by the CPU 303 reading the program from a recording medium such as the auxiliary storage device 307, so that the functional blocks to be implemented by the program are loaded to the RAM 305. In other words, the functional blocks to be implemented by the program are generated on the RAM 305.

Part or all of the functional blocks that can be implemented by the programs may be implemented by hardware such as an integrated circuit (IC) instead of being implemented by the programs.

According to an embodiment, it is possible to reduce the time required for user authentication when a plurality of image processing devices are to be operated in cooperation with each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image processing system comprising:
a first image processing device;
one or more second image processing devices; and
a server device, wherein
the first image processing device comprises:
memory storing computer-readable instructions; and
one or more processors configured to execute the computer-readable instructions such that the one or more processors are configured to perform operations including,
receiving an input of first authentication information for authenticating a user based on a first authentication method;
authenticating on an own device by using the first authentication information; and
using the one or more second image processing devices, and
transmitting, when a function of the one or more second image processing devices is to be operated, the first authentication information to the one or more second image processing devices, and transmitting, when authentication to only a second image processing device of a plurality of image processing devices based on the first authentication information has failed, a transmission request of authentication method information indicating a second authentication method of the second image processing device to the second image processing device, the authentication to which based on the first authentication information has failed; and wherein the server device includes:

memory storing computer-readable instructions; and one or more processors configured to execute the computer-readable instructions such that the one or more processors are configured to perform operations including, transmitting, when receiving the first authentication information from the first image processing device, the first authentication information to the one or more second image processing devices, and transmitting, when receiving an authentication result based on the first authentication information from each of the one or more second image processing devices, the authentication result to the first image processing device.

2. The image processing system according to claim 1, wherein the one or more processors of the server unit transmits, when receiving the transmission request of authentication method information from the first image processing device, the transmission request of authentication method information to the second image processing device, the authentication to which based on the first authentication information has failed, and transmits, when receiving the authentication method information from the second image processing device, the authentication to which based on the first authentication information has failed, the authentication method information to the first image processing device.

3. An image processing device comprising:

a processor; and a memory, wherein by the processor executing commands read out from the memory, the image processing device executes:

receiving an input of first authentication information for authenticating a user based on a first authentication method at an input unit;

performing authentication on an own device by using the first authentication information at an authentication unit;

using a function of the one or more second image processing devices at a cooperating unit;

transmitting, when the cooperating unit is to be operated, the first authentication information to a server device at the authentication unit, wherein the server device transmits the first authentication information to the one or more second image processing devices;

receiving an authentication result from the server device, wherein the server device receives the authentication result based on the first authentication information from each of the one or more second image processing devices; and transmitting, when authentication to only a second image processing device of the one or more second image processing devices based on the first authentication information has failed, a transmission request of authentication method information indicating a second authentication method of the second image processing device to the second image processing device, the authentication to which based on the first authentication information has failed, at the authentication unit.

4. An authentication method for a first image processing device connected to one or more second image processing devices, the authentication method comprising:

receiving an input of first authentication information for authenticating a user based on a first authentication method at an input unit;

performing authentication on an own device by using the first authentication information at an authentication unit;

using a function of the one or more second image processing devices at a cooperating unit;

transmitting, when the cooperating unit is to be operated, the first authentication information to a server device at the authentication unit, wherein the server device transmits the first authentication information to the one or more second image processing devices;

receiving an authentication result from the server device, wherein the server device receives the authentication result based on the first authentication information from each of the one or more second image processing devices; and transmitting, when authentication to only a second image processing device of the one or more second image processing devices based on the first authentication information has failed, a transmission request of authentication method information indicating a second authentication method of the second image processing device to the second image processing device, the authentication to which based on the first authentication information has failed, at the authentication unit.

* * * * *